US012682487B2

(12) United States Patent
Hori et al.

(10) Patent No.: US 12,682,487 B2
(45) Date of Patent: Jul. 14, 2026

(54) IMAGE RECOGNITION DEVICE, METHOD FOR IMAGE RECOGNITION DEVICE, AND RECORDING MEDIUM

(71) Applicant: OMRON Corporation, Kyoto (JP)

(72) Inventors: Takahiro Hori, Kyoto (JP); Ayana Tsuji, Kyoto (JP)

(73) Assignee: OMRON Corporation, Kyoto (JP)

( * ) Notice: Subject to any disclaimer, the term of this patent is extended or adjusted under 35 U.S.C. 154(b) by 291 days.

(21) Appl. No.: 18/287,022

(22) PCT Filed: Mar. 16, 2022

(86) PCT No.: PCT/JP2022/011802
§ 371 (c)(1),
(2) Date: Oct. 16, 2023

(87) PCT Pub. No.: WO2022/244424
PCT Pub. Date: Nov. 24, 2022

(65) Prior Publication Data
US 2024/0202971 A1      Jun. 20, 2024

(30) Foreign Application Priority Data

May 18, 2021      (JP) ................................. 2021-084061

(51) Int. Cl.
*G06T 7/73*          (2017.01)
*G06T 7/60*          (2017.01)
*G06V 40/10*        (2022.01)

(52) U.S. Cl.
CPC .................. *G06T 7/74* (2017.01); *G06T 7/60* (2013.01); *G06V 40/10* (2022.01); *G06T 2207/30196* (2013.01)

(58) Field of Classification Search
CPC ... G06T 7/74; G06T 7/60; G06T 2207/30196; G06V 40/10; G06V 20/58
See application file for complete search history.

(56) References Cited

U.S. PATENT DOCUMENTS

| | | | | |
|---|---|---|---|---|
| 2006/0222205 A1* | 10/2006 | Porikli | ................... | G06V 10/24 |
| | | | | 382/103 |
| 2016/0260226 A1* | 9/2016 | Yano | ....................... | G06T 7/248 |
| 2022/0180533 A1* | 6/2022 | Oami | .................... | G06T 7/0002 |

FOREIGN PATENT DOCUMENTS

| | | |
|---|---|---|
| JP | 2016080550 | 5/2016 |
| JP | 2019159739 | 9/2019 |
| JP | 2020149111 | 9/2020 |

OTHER PUBLICATIONS

"International Search Report (Form PCT/ISA/210) of PCT/JP2022/011802", mailed on Jun. 14, 2022, with English translation thereof, pp. 1-4.

(Continued)

*Primary Examiner* — Oneal R Mistry
*Assistant Examiner* — Justin Philip Cascais
(74) *Attorney, Agent, or Firm* — JCIPRNET

(57) ABSTRACT

It is necessary to input and register the size of an object in advance for each installation environment, which takes time and effort. This image recognition device comprises: an image acquisition unit (11) that acquires an image; a detection unit (12) that detects a detection object from the image; an index creation unit (14) that creates an index for determining whether the detection object is a target object from the history of the location and size of the detection object; and a determination unit (15) that uses the index to determine whether the detection object is the target object, wherein the index is information representing a distribution trend of the location and size of the detection object in the history.

3 Claims, 5 Drawing Sheets

(56)           References Cited

OTHER PUBLICATIONS

"Written Opinion of the International Searching Authority (Form PCT/ISA/237) of PCT/JP2022/011802", mailed on Jun. 14, 2022, with English translation thereof, pp. 1-6.

* cited by examiner

IMAGE RECOGNITION DEVICE, METHOD FOR IMAGE RECOGNITION DEVICE, AND RECORDING MEDIUM

CROSS-REFERENCE TO RELATED APPLICATION

This application is a 371 application of the International PCT application serial no. PCT/JP2022/011802, filed on Mar. 16, 2022, which claims the priority benefits of Japan Patent Application No. 2021-084061, filed on May 18, 2021. The entirety of each of the above-mentioned patent applications is hereby incorporated by reference herein and made a part of this specification.

TECHNICAL FIELD

The present invention relates to an image recognition device.

RELATED ART

With the spread of network cameras, many techniques for detecting people, objects, etc. from captured images have been used. When detecting a person from a captured image, an object having a shape similar to the shape of a person or a combination of shapes in the captured image may be erroneously detected as a person. If such false detection occurs frequently, appropriate image recognition cannot be performed.

In Patent Literature 1, a technique for improving detection accuracy of a detection target object by detecting an object of a specific size as the detection target object according to the distance from the reference location in the fisheye image is disclosed.

CITATION LIST

Patent Literature

[Patent Literature 1] Japanese Patent Application Laid-Open No. 2019-159739

SUMMARY OF INVENTION

Technical Problem

However, in the conventional technology as described above, the relationship between the size of a detection object to be determined as a person and the distance from the reference location of the detection object needs to be input and registered in advance. Therefore, a user needs to input information about the imaging environment of the camera, for example, information such as the installation height of the camera, the height of the detection target, and the relationship between the distance from the center (reference location) in the image and the distance in the real space in advance. Such input work imposes a heavy burden on the user.

Accordingly, an object of an aspect of the present invention is to realize an image recognition device that detects a desired object with higher accuracy without requiring complicated preliminary input work by a user.

Solution to Problem

In order to solve the above problems, an image recognition device according to an aspect of the present invention includes: an image acquisition unit that acquires a captured image; a detection unit that detects a predetermined type of object as a detection object by image recognition from the captured image; a recording control unit that performs control to record a history of the location and the size of the detection object in the captured image detected by the detection unit; an index creation unit that creates an index for determining whether the detection object is a target object to be detected based on the history; and a determination unit that determines whether the detection object is the target object by comparing the location and the size of the detection object in the captured image detected by the detection unit with the index.

A method for an image recognition device according to another aspect includes: an image acquisition step of acquiring a captured image; a detection step of detecting a predetermined type of object as a detection object by image recognition from the captured image; a recording control step of performing control to record a history of a location and a size of the detection object in the captured image detected in the detection step; an index creation step of creating an index for determining whether the detection object is a target object to be detected based on the history; and a determination step of determining whether the detection object is the target object by comparing the location and the size of the detection object in the captured image detected in the detection step with the index.

Effects of Invention

According to an aspect of the present invention, an image recognition device that more accurately detects a desired object without requiring complicated preliminary input work by the user may be realized.

DESCRIPTION OF EMBODIMENTS

First Embodiment

Figure 1:
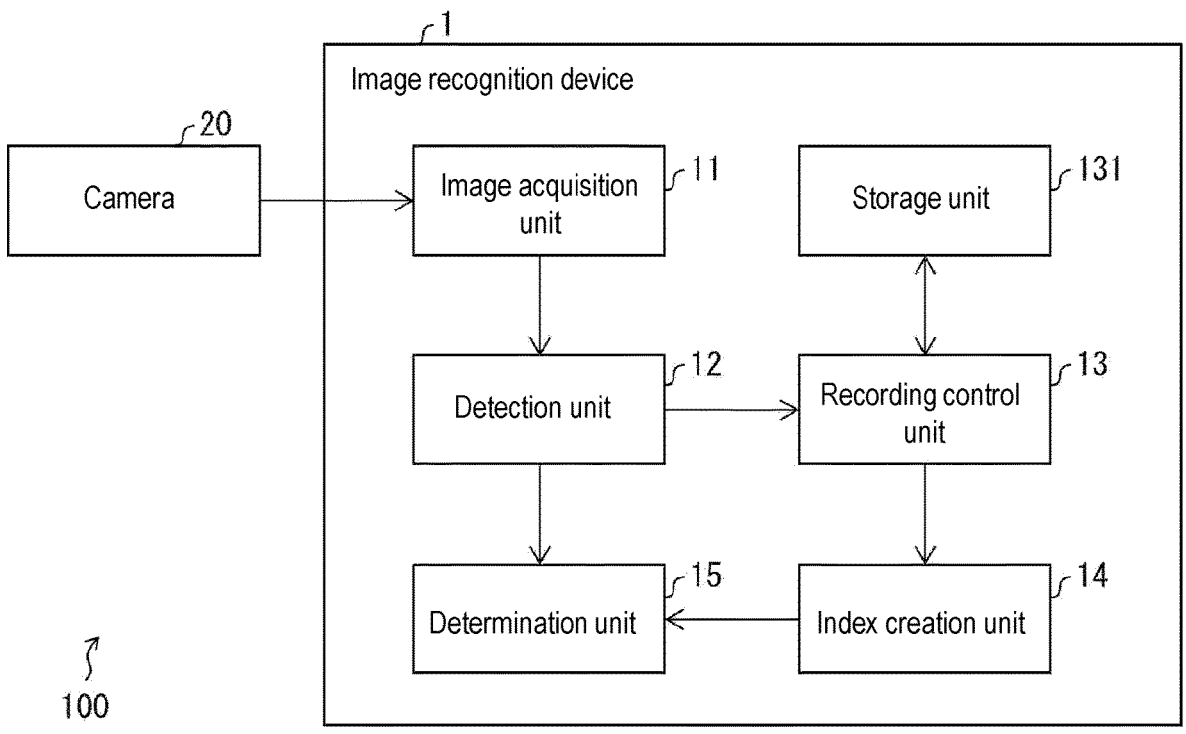
FIG. 1 is a block diagram showing the configuration of main parts of an image recognition system according to a first embodiment.

Hereinafter, an embodiment (hereinafter also referred to as "the embodiment") according to an aspect of the present invention will be described based on the drawings. Further, the same or equivalent parts in the drawings are denoted by the same reference numerals, and the description thereof will not be repeated.

§ 1. Application Example

FIG. 1 is a block diagram showing the configuration of main parts of an image recognition system 100 according to a first embodiment. The image recognition system 100 includes a camera 20 and an image recognition device 1 that acquires an image captured by the camera 20 and performs image recognition. Once the camera 20 is mounted, the angle of view and the imaging direction do not change and are constant.

The image recognition device 1 detects a predetermined type of object by a detection unit 12 from the captured image acquired by an image acquisition unit 11, and determines whether the detection object is the target object to be detected by a determination unit 15 related to a detected detection object. For the determination by the determination unit 15, whether the detection object is the target object is determined based on the index acquired by a recording control unit 13.

The index defines in advance a correspondence relationship between a location of the detection object in the captured image and the size of the target object at the location. Thus, when the size of the detection object is close to the size of the index corresponding to the location of the detection object in the captured image, the detection object can be determined to be the target object.

§ 2. Configuration Example (Configuration of Image Recognition Device 1)

The image recognition device 1 includes the image acquisition unit 11, the detection unit 12, the recording control unit 13, a storage unit 131, an index creation unit 14 and the determination unit 15.

The image acquisition unit 11 acquires a captured image captured by the camera 20. The captured image is output to the detection unit 12.

The detection unit 12 detects a predetermined type of object in the input captured image by image recognition. A representative object is a person, but the object is not limited to a person and may be any object. The location and the size of the detection object, which are the results of detection by the detection unit 12, are output to the recording control unit 13 and the determination unit 15.

Here, the location of the detection object is the center of a frame (detection frame) surrounding the detection object. The method of deriving the location of the detection object is not limited to this method, and other derivation methods such as any point on the detection frame or the center of gravity of the detected detection object may be used.

Further, the size of the detection object may be various lengths of the detection frame. Examples of the length of the detection frame include the length of the diagonal line, the length in the vertical direction, the length in the horizontal direction, the length in the vertical direction or the horizontal direction, whichever is longer, and the length in the vertical direction or the horizontal direction, whichever is shorter. Also, the size of the detection object may be the area of the detection frame. Furthermore, when an area occupied by the detection object itself is specified, the size of the detection object may be various lengths or areas of the area.

The recording control unit 13 controls data to be recorded in the storage unit 131 that records programs and various parameters of the image recognition device 1. Specifically, the recording control unit 13 causes the storage unit 131 to record the correspondence relationship between the location and the size of the detection object as a detection history (history). The recording control unit 13 outputs the detection history recorded in the storage unit 131 to the index creation unit 14.

The storage unit 131 is not limited to the functional blocks of the image recognition device 1, and may be provided in an external device. That is, the recording control unit 13 may access the storage unit 131 provided in an external device via various communication means to record the detection history and acquire the detection history.

The index creation unit 14 creates an index representing a distribution trend of the location and the size of the detection object based on the detection history. The index is information that can be expressed in the form of a function, for example, and is used to determine whether the detection object is the target object. The index creation unit 14 outputs the created index to the determination unit 15.

The determination unit 15 determines whether the detection object detected by the detection unit 12 is the target object based on the index created by the index creation unit 14. The determination unit 15 outputs the determined result. Examples of the output destination of the determination result by the determination unit 15 include a display control unit of a display device (not shown) and a communication control unit for transmitting to an arbitrary server or a terminal device via a communication network.

(Captured Image Accompanying Mounting of Camera 20)

Figure 2:
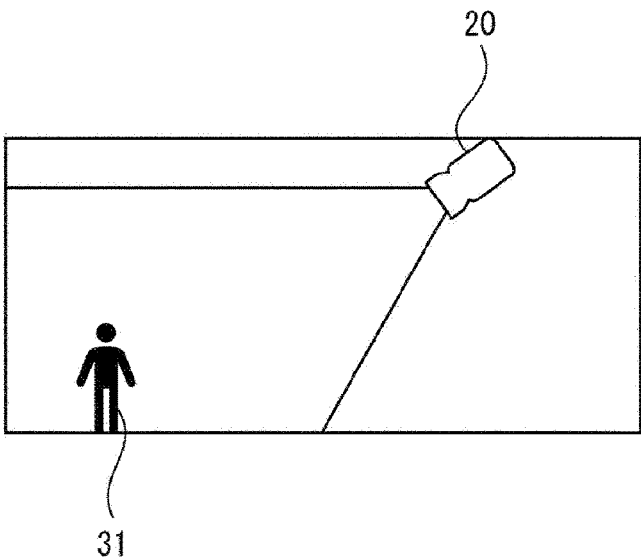
FIG. 2 is a model diagram showing a case where a camera is mounted above and captures an image in a downward direction.
Figure 3:
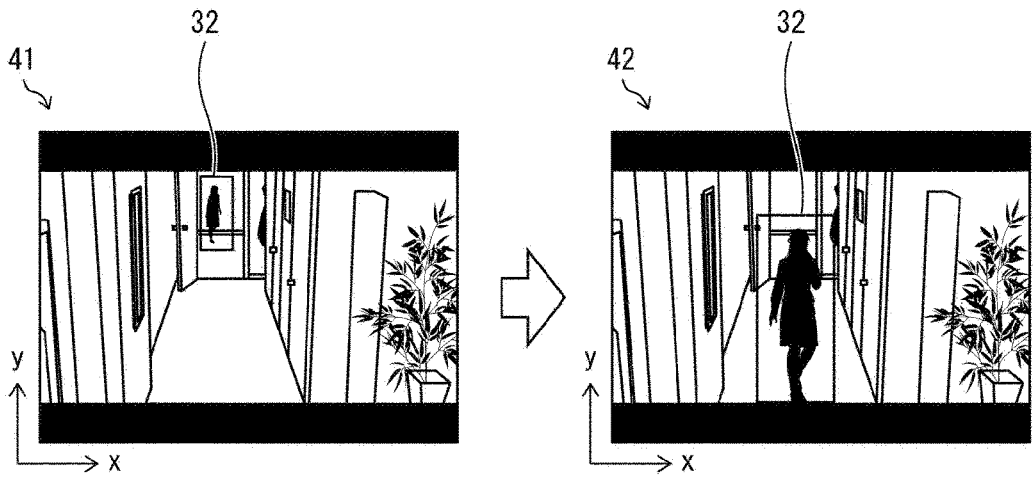
FIG. 3 is a diagram showing temporal changes in captured images when the camera is mounted above and captures an image in a downward direction.
Figure 4:
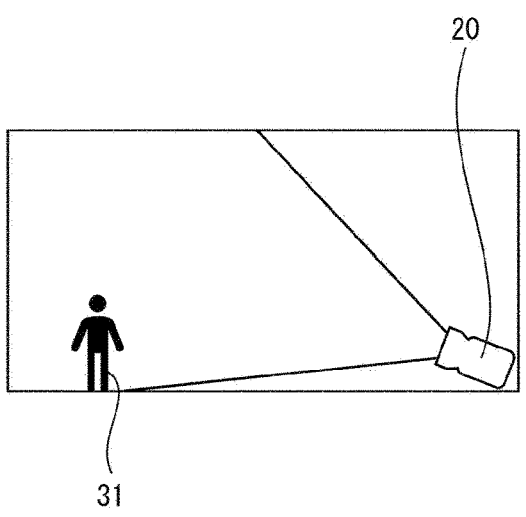
FIG. 4 is a model diagram showing a case where a camera is mounted below and captures an image in an upward direction.
Figure 5:
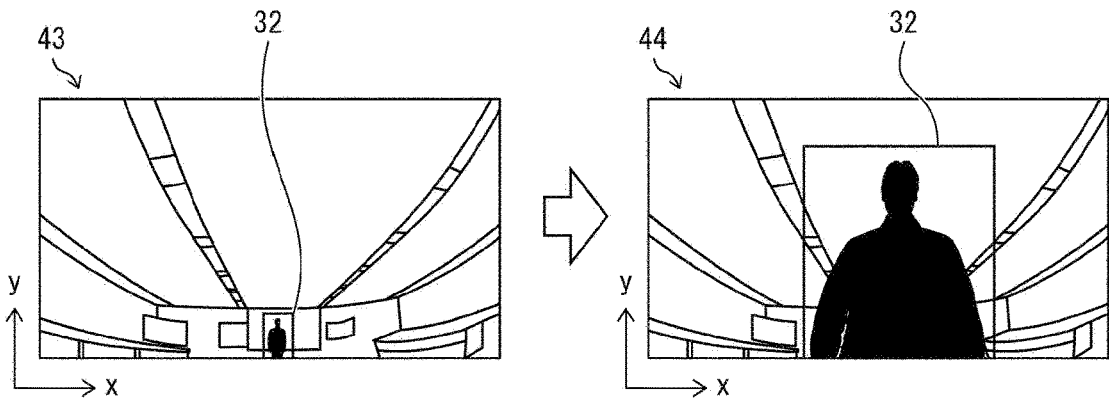
FIG. 5 is a diagram showing temporal changes in captured images when the camera is mounted below and captures an image in an upward direction.

FIG. 2 is a model diagram showing a case where the camera 20 is mounted above and captures an image in a downward direction. FIG. 3 is a diagram showing temporal changes in captured images when the camera 20 is mounted above and captures an image in a downward direction. FIG. 4 is a model diagram showing a case where the camera 20 is mounted below and captures an image in an upward direction. FIG. 5 is a diagram showing temporal changes in captured images when the camera 20 is mounted below and captures an image in an upward direction.

The image recognition device 1 detects an object assumed to be a person as a detection object 32 from the captured image. In the following description, it is assumed that the origin is at the lower left of the captured image, an X axis is in the horizontal direction, and a Y axis is in the vertical direction.

First, as shown in FIG. 2, a case where the camera 20 is mounted above and captures an image of an object 31 in a downward direction is considered. As shown in an image 41 of FIG. 3, an object far from the camera 20 appears smaller in the upper part of the captured image, and as shown in an image 42 of FIG. 3, the objects near the camera 20 appears larger in the lower part of the captured image.

As shown in FIG. 3, the detection object 32 walking from a distance to the vicinity of the camera 20 gradually increases in size as the distance to the camera 20 decreases, and the location in the captured image moves from the top (a Y coordinate is large) to the bottom (the Y coordinate is small).

Also, as shown in FIG. 4, a case where the camera 20 is mounted below and captures an image of the object 31 in an upward direction is considered. As shown in an image 43 of FIG. 5, an object far from the camera 20 appears smaller in the lower part of the captured image, and as shown in an image 44 of FIG. 5, the object near the camera 20 appears larger in the upper part of the captured image.

As shown in FIG. 5, the detection object 32 walking from a distance to the vicinity of the camera 20 gradually increases in size as the distance to the camera 20 decreases, and the location in the captured image moves from the bottom (the Y coordinate is small) to the top (the Y coordinate is large).

In other words, regardless of how the camera 20 is mounted, the location and the size of the detection object change according to the movement of the detection object. (False Detection by Camera 20)

Figure 6:
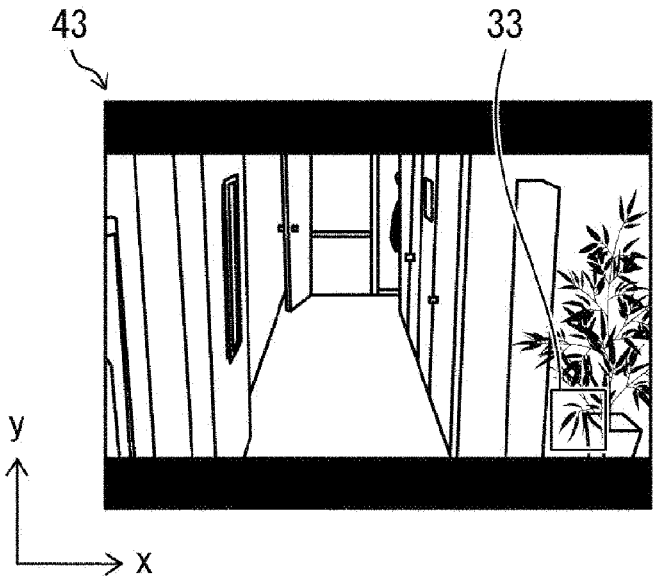
FIG. 6 is an example in which an erroneous object is detected when the camera is mounted above.
Figure 7:
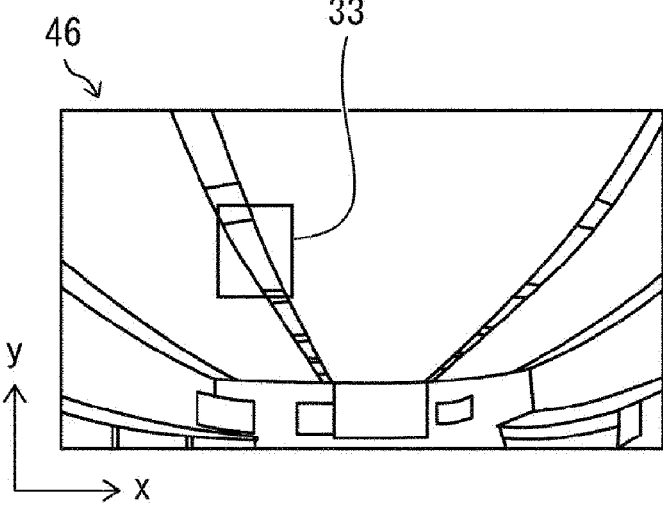
FIG. 7 is an example in which an erroneous object is detected when the camera is mounted below.

FIG. 6 shows an example in which an erroneous object is detected when the camera 20 is mounted above. FIG. 7 shows an example in which an erroneous object is detected when the camera 20 is mounted below.

As shown in FIG. 6, when the camera 20 is mounted above, the image recognition device 1 may erroneously detect an object that is not a person at the location indicated by a detection frame 33. This occurs, for example, when the background image resembles the shape of a human body. If an object that is not a person is erroneously detected, the size at the location (the Y coordinate) where the detection frame 33 is displayed is highly likely different from the above-described situation in which a person is detected.

Similarly, as shown in FIG. 7, when the camera 20 is mounted below, the image recognition device 1 may erroneously detect an object that is not a person at the location indicated by the detection frame 33.

That is, in FIG. 6, the detection frame 33 is displayed at the bottom of the image when the camera 20 is mounted above. Originally, the detection frame 33 should be relatively large because the location of the detection frame 33 is at the bottom of the image, but the detected detection frame 33 is relatively small. Similarly, in FIG. 7, the detection frame 33 is displayed at the top of the image when the camera 20 is mounted below. Originally, the detection frame should be relatively large because the location of the detection frame 33 is at the top of the image, but the detected detection frame 33 is relatively small. In this way, the location and the size of the detection frame in the case of false detection are highly likely to be different from the location and the size of the detection frame in the case where a person is detected. Therefore, false detection may be determined based on the index indicating the location and the size of the detection frame.
(Correlation Between Location and Size of Detection Object 32)

Figure 8:
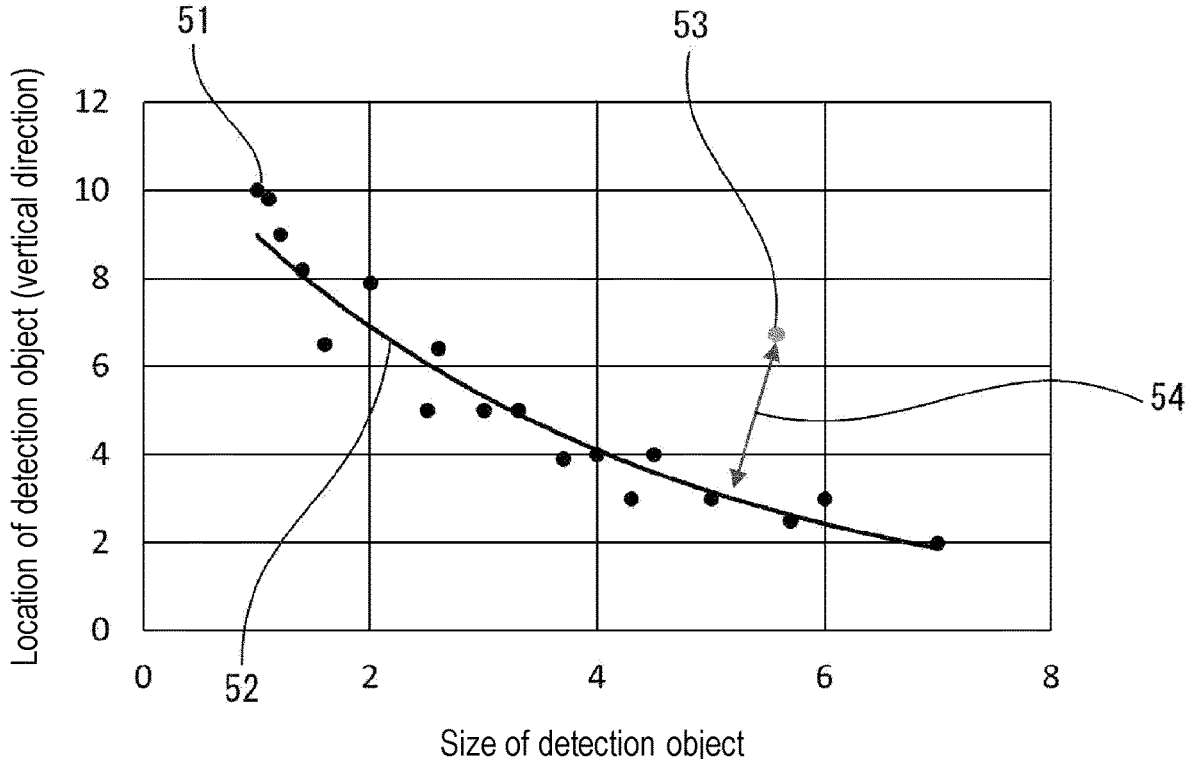
FIG. 8 is a diagram showing the correlation between the location (Y coordinate) and the size of a detection object.

FIG. 8 is a diagram showing the correlation between the location (the Y coordinate) and the size of the detection object 32. The storage unit 131 records a detection history in which the locations and the sizes of the detection object detected in the past are associated with each other. FIG. 8 shows a state in which the detection history is plotted on a two-axis scatter diagram as a detection history distribution. In the detection history distribution, the horizontal axis plots the size of the detection object, and the vertical axis plots the location of the detection object (the location in the vertical direction of the captured image (the Y coordinate)). A large number of points 51 exhibit some degree of correlation and have a discrete distribution.

The index creation unit 14 acquires the detection history from the storage unit 131 and derives an approximate curve 52 based on the large number of points 51. A method for deriving the approximate curve 52 may be, for example, the least squares method, but is not limited thereto, and any approximate curve derivation method may be used.

Here, when the detection history includes erroneously detected data at the stage of creating the detection history, it is conceivable that points that greatly deviate from the approximate curve exist. However, if the number of points that greatly deviate from each other is small, the effect on the approximate curve 52 is small and can be ignored. That is, when the probability of occurrence of false detection is low, even if false detection data is included at the stage of creating the detection history, a sufficiently appropriate index may be created. It should be noted that after the number of detection histories reaches a certain number or more, merely the data in which the detection object is determined to be the target object by the determination unit 15 is added to the detection history, and the adverse effect on index creation due to false detection data may be eliminated.

The index creation unit 14 creates the approximate curve 52 that indicates the distribution trend of the large number of points 51, but not limited thereto, and any index may be used. For example, a function can be used. The approximate curve 52 representing the function is not limited to a continuous curve, and may be a discontinuous curve or straight line for each of predetermined ranges of locations and sizes. Also, the function may be expressed in a table format in which a value is determined for each of the predetermined ranges of the locations and the sizes.

Here, the determination processing in the determination unit 15 in a state in which the index as described above is obtained is described. When the detection object 32 is detected, the determination unit 15 compares the location and the size of the detection object 32 with the above function as an index. Conceptually, the comparison processing plots the location and the size of the detection object 32 at a point 53 shown in FIG. 8, calculates a distance 54 from the approximate curve 52 and compares the distance 54 with a predetermined value. Here, the distance 54 is the shortest distance between the point 53 and the approximate curve 52. It should be noted that the distance 54 may be the difference in Y coordinates between the point 53 and the approximate curve 52. The calculation method of the distance 54 is not limited thereto, and any calculation method may be used.

§ 3. Operation Example

Figure 9:
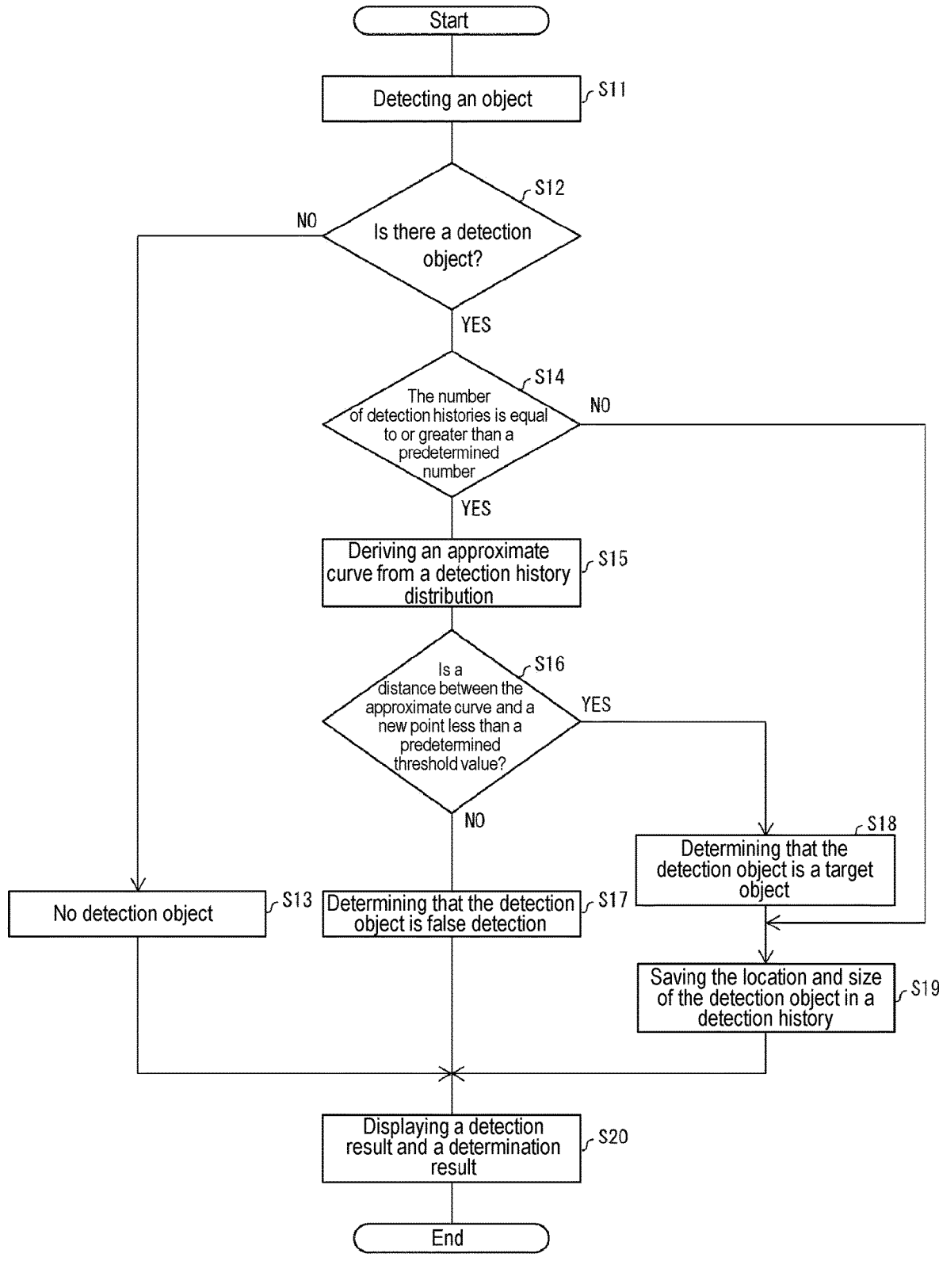
FIG. 9 is a flowchart showing an operation example of the image recognition system according to the first embodiment.

FIG. 9 is a flowchart showing an operation example of the image recognition system 100 according to the first embodiment.

In S11, the image acquisition unit 11 acquires a captured image from the camera 20. The acquired captured image is output to the detection unit 12. The detection unit 12 detects the object 31 from the input captured image and uses the object 31 as the detection object 32.

In S12, the detection unit 12 determines whether at least one detection object 32 is detected. If the at least one detection object 32 is not detected (No in S12), the process proceeds to S13. On the other hand, if the at least one detection object 32 is detected (Yes in S12), the process proceeds to S14.

In S13, the determination unit 15 displays that no detection object 32 exists.

In S14, the recording control unit 13 determines whether the number of detection histories is equal to or greater than a predetermined number. If the number is less than the predetermined number (No in S14), the process proceeds to S19. On the other hand, if the number is equal to or greater than the predetermined number (Yes in S14), the process proceeds to S15.

In S15, the index creation unit 14 reads the detection history from the storage unit 131 and derives the approximate curve 52 reflecting the trend of the detection history distribution as an index.

In S16, the distance 54 between the approximate curve 52 and the point 53 corresponding to the location and the size of the detection object 32 detected this time is calculated. If the calculated distance 54 is equal to or greater than a predetermined threshold value (No in S16), the process proceeds to S17. On the other hand, if the calculated distance 54 is less than the predetermined threshold value (Yes in S16), the process proceeds to S18.

In S17, the determination unit 15 determines that the detection object 32 is not a person (the target object) but is false detection.

In S18, the determination unit 15 determines that the detection object 32 is a person.

In S19, the recording control unit 13 stores the location and the size of the detection object in the detection history.

In S20, the determination unit 15 outputs the respective results of the detection unit 12 and the determination unit 15, and displays the results on the display device.

Here, the recording control unit 13 allows the user to visually check the respective results of the detection unit 12 and the determination unit 15, and a detection object that is clearly considered to be erroneously detected or erroneously determined can be prevented from being used for generating an approximate curve in the detection history distribution by setting a flag indicating false detection. The operation improves the determination accuracy of the target object among the detection objects.

§ 4. Action/Effect

Even if the camera 20 is mounted above and captures the image in the downward direction, or even if the camera 20 is mounted below and captures the image in the upward direction, in both cases, the location and the size of the detection object on the image change as the detection object that is the object on the image moves. Since there is a relationship between changes in the location and the size of the detection object, the index is derived from the distribution trend obtained from the relationship. By comparing the location and the size of the detection object with respect to the index, whether the detection object is the target object to be detected may be determined. Therefore, whether an object other than the target object is erroneously detected may be determined, thereby improving the detection accuracy of the target object.

Therefore, the location and the size of the detected object are automatically recorded, and when the number of combinations of the recorded location and size exceeds a predetermined number, whether the detection object is the target object (for example, a person) or another object becomes able to be determined. Therefore, since a person may be detected and determined without inputting in advance information such as the size of the person for each of installation environments according to the mounting location of the camera 20, the ease of use is good.

By collecting a predetermined number of histories of the locations and the sizes of the detection object, the distribution trend of the locations and the sizes of the detection object may be understood and an index with high accuracy may be created.

In particular, the index may be a function or even an approximate curve in two-dimensional space, and whether the detection object is the target object can be determined by considering only the vertical direction in the image.

In addition, the approximate curve is considered to be the size of the detection object in the vertical direction, but not limited thereto, and may be the size of the detection object with respect to a one-dimensional location in any one axial direction. That is, the approximate curve may be the size of the detection object in the horizontal direction, or the size of the detection object in relation to a straight line having an arbitrary inclination on the captured image, and the approximate curve may be a function obtained from a point group representing the one-dimensional location and the size of the detection object. For example, when the camera 20 is installed on the side wall of the corridor at approximately the same height as the human body, and the imaging direction is determined so that the far side of the corridor is on the left side of the captured image and the vicinity of the corridor is on the right side of the captured image, the size of the target object increases from the left side to the right side of the captured image. In this case, the approximate curve may be set according to the size of the detection object in the horizontal direction of the captured image.

First Modified Example

In the first embodiment, only the vertical direction of the image is taken into consideration for the location of the detection object, but in a first modified example, an example in which the vertical and horizontal directions of the image are taken into consideration is described. That is, the size of the detection object is associated with an X coordinate and the Y coordinate on the image.

Therefore, the detection history distribution is obtained as a three-axis scatter diagram of the X coordinate of the detection object, the Y coordinate of the detection object and the size of the detection object. Also, the index derived from the detection history distribution is an approximate curved surface. The approximate curved surface may be represented by a function. Moreover, the approximate curved surface representing the function is not limited to a continuous curved surface, and may be a discontinuous curved surface or plane for each of predetermined ranges of locations and sizes. Also, the function may be expressed in a table format in which a value is determined for each of the predetermined ranges of the locations and the sizes.

Therefore, in the first modified example, a new point representing the X coordinate, the Y coordinate and the size of the detection object in three dimensions can be used to calculate the distance to the approximate curved surface. When calculating the distance, the distance to the point on the approximate curved surface that is closest to the new point may be used. Alternatively, the distance to a point on the approximate curved surface corresponding to the size of the new point in the X coordinate and Y coordinate may be used. If the distances are less than a predetermined value, the detection object is determined to be the target object (a person).

Compared to the first embodiment, in the first modified example, since the detection history distribution can be represented by a three-axis scatter diagram, an approximate curved surface in consideration of the three-dimensional depth relationship may be created. Therefore, even if the Y coordinate is the same, the case where the size is different if the X coordinate is different may be coped with.

For example, when a height difference such as stairs exists in a space to be captured, the change trend of the size of the target object may differ depending on the location of the captured image. In such a case, by setting an approximate curved surface according to the height difference, whether the object is the target object becomes able to be accurately determined.

Furthermore, when an area such as a wall where an object cannot enter exists in the range of the captured image, by setting the size of the detection object to 0 or a maximum value in advance for the area such as the wall, the area where the object cannot exist can also be clearly defined. However, in this case, the user has to input information regarding the relationship between the location and the size of the detection object in advance.

Also, the approximate curved surface is considered in terms of the size of the detection object with respect to the two-dimensional space of the X coordinate and the Y coordinate, but is not limited thereto, and may be considered in terms of the size of the detection object with respect to the two-dimensional location in predetermined two axial directions. In this case, the function may be a three-dimensional approximate curved surface of the two-dimensional location of the detection object and the size of the detection object.

Second Modified Example

In the first embodiment, the camera 20 is angled with respect to the vertical direction, but in a second modified example, a case where the optical axis is oriented in the vertical direction is described. For example, the case is when the camera 20 is directed directly downward and is mounted on the ceiling.

In such a case, in general, the use of a fisheye lens, a wide-angle lens, or the like is common. With the lenses, even if the lenses are equidistant from the camera 20, an object positioned at an angle with respect to the optical axis of the camera 20 has the property of having a smaller image in the captured image than an object positioned on the optical axis.

In addition, captured images have the property that images are arranged concentrically around the optical axis. Therefore, in the detection history, unlike the trend of the first embodiment, the location of the detection object can be expressed not by the Y coordinate but by the radius from the center location.

Third Modified Example

In the first embodiment, whether the detection object is the target object is determined from the relationship between the approximate curve and the location and the size of the detection object. In a third modified example, without using the approximate curve, whether the detection object is the target object is determined by Artificial Intelligence (AI) from the detection history distribution and the location and the size of the detection object. For example, machine learning for outlier determination may be performed.

Even in this case, even if a clear outlier corresponding to false detection is included in the detection history distribution, the influence of the outlier is minimized in the learning stage and becomes no longer a problem.

SUMMARY

In order to solve the above problems, an image recognition device according to an aspect of the present invention includes: an image acquisition unit that acquires a captured image; a detection unit that detects a predetermined type of object as a detection object by image recognition from the captured image; a recording control unit that performs control to record a history of the location and the size of the detection object in the captured image detected by the detection unit; an index creation unit that creates an index for determining whether the detection object is a target object to be detected based on the history; and a determination unit that determines whether the detection object is the target object by comparing the location and the size of the detection object in the captured image detected by the detection unit with the index.

According to the above configuration, an index is created based on the history of the location and the size of the detection object, and whether the detection object is the target object can be determined from the location and the size of the detection object with respect to the index. Therefore, the detection accuracy of the target object can be improved without requiring the user to input information in advance according to the environment.

The index creation unit may create a function representing the relationship between the location of the detection object and the size of the detection object as the index.

According to the above configuration, the function may be derived as an index. By using the function, the size of the detection object at any location of the detection object can be uniquely derived.

When the distance determined from the function and the location and the size of the detection object in the captured image is less than a predetermined threshold value, the determination unit may determine that the detection object is the target object.

According to the above configuration, the determination unit calculates the distance between a point determined by the location and the size of the detection object and the function, and if the distance is less than the predetermined threshold value, whether the detection object is the target object can be determined.

The recording control unit performs control to record a correspondence relationship between a one-dimensional location of the detection object and a size of the detection object in a predetermined uniaxial direction in the captured image, the function is a two-dimensional approximate curve between the one-dimensional location of the detection object and the size of the detection object, and the distance may be a distance between a point representing the one-dimensional location of the detection object and the size of the detection object and the approximate curve.

According to the above configuration, the size of the detection object may be determined as the target object by considering only the vertical direction in the image, and false detection of the detection object may be determined.

The recording control unit performs control to record a correspondence relationship between a two-dimensional location of the detection object and a size of the detection object in predetermined two axial directions in the captured image, the function is a three-dimensional approximate curved surface of the two-dimensional location of the detection object and the size of the detection object, and the distance may be a distance between a point representing the two-dimensional location of the detection object and the size of the detection object and the approximate curved surface.

According to the above configuration, false detection of a detection object can be determined in consideration of the vertical and horizontal directions in the image. By also using the horizontal direction for determination, accurate detection may be performed even when a height difference such as a staircase exists in a space to be captured.

A method for an image recognition device according to another aspect includes: an image acquisition step of acquiring a captured image; a detection step of detecting a predetermined type of object as a detection object by image recognition from the captured image; a recording control step of performing control to record a history of a location and a size of the detection object in the captured image detected in the detection step; an index creation step of creating an index for determining whether the detection object is a target object to be detected based on the history; and a determination step of determining whether the detection object is the target object by comparing the location and the size of the detection object in the captured image detected in the detection step with the index.

The image recognition device according to each of the aspects of the present invention may be realized by a computer. In this case, an image recognition program for an image recognition device that realizes the image recognition device on a computer by operating a computer as each of parts (software elements) provided in the image recognition device and a computer-readable recording medium recording the program also fall within the scope of the present invention.

Example of Realization by Software

The function of the image recognition device 1 (hereinafter referred to as "device") is a program for causing a computer to function as the device, and can be realized by a program for causing the computer to function as each of control blocks of the device (especially each of parts included in the image recognition device 1).

In this case, the device includes a computer having at least one control device (e.g., a processor) and at least one storage device (e.g., a memory) as hardware for executing the program. Each of the functions described in each of the above embodiments is realized by executing the program by using the control device and the storage device.

The program may be recorded on one or more non-temporary and computer-readable recording media. The recording medium may or may not be included in the device. In the latter case, the program may be supplied to the device via any wired or wireless transmission medium.

Also, a part or all of the functions of each of the control blocks may be realized by a logic circuit. For example, an integrated circuit in which a logic circuit functioning as each of the control blocks is formed is also included in the scope of the present invention. In addition, the function of each of the control blocks may be realized by, for example, a quantum computer.

Additional Notes

The present invention is not limited to the above-described embodiments, various modifications may be made within the scope indicated in the claims, and embodiments obtained by appropriately combining technical means disclosed in different embodiments are also included in the technical scope of the present invention.

What is claimed is:

1. An image recognition device, comprising:
a processor configured to:
acquire a captured image;
detect a predetermined type of object as a detection object by image recognition from the captured image;

perform control to record a history of a location and a size of the detection object detected from the captured image;

create an index for determining whether the detection object is a target object to be detected based on the history; and determine whether the detection object is the target object by comparing the location and the size of the detection object detected from the captured image with the index, wherein the processor creates a function indicating a relationship between the location of the detection object and the size of the detection object as the index and determines that the detection object is the target object in response to a distance determined from the function and the location and the size of the detection object in the captured image being less than a predetermined threshold value, wherein the processor performs control to record a correspondence relationship between a one-dimensional location of the detection object and a size of the detection object in a predetermined uniaxial direction in the captured image, the function is a two-dimensional approximate curve between the one-dimensional location of the detection object and the size of the detection object, and the distance is a distance between a point representing the one-dimensional location of the detection object and the size of the detection object and the approximate curve; or the processor performs control to record a correspondence relationship between a two-dimensional location of the detection object and a size of the detection object in predetermined two axial directions in the captured image, the function is a three-dimensional approximate curved surface of the two-dimensional location of the detection object and the size of the detection object, and the distance is a distance between a point representing the two-dimensional location of the detection object and the size of the detection object and the approximate curved surface.

2. A method for an image recognition device, comprising:
an image acquisition step of acquiring a captured image;
a detection step of detecting a predetermined type of object as a detection object by image recognition from the captured image;
a recording control step of performing control to record a history of a location and a size of the detection object in the captured image detected in the detection step;
an index creation step of creating an index for determining whether the detection object is a target object to be detected based on the history;
a determining step of determining whether the detection object is the target object by comparing the location and the size of the detection object in the captured image detected in the detection step with the index, wherein
a function indicating a relationship between the location of the detection object and the size of the detection object is created as the index and the detection object is determined as the target object in response to a distance determined from the function and the location and the size of the detection object in the captured image being less than a predetermined threshold value; and
a step of performing control to record a correspondence relationship between a one-dimensional location of the detection object and a size of the detection object in a predetermined uniaxial direction in the captured image, wherein the function is a two-dimensional approximate curve between the one-dimensional location of the detection object and the size of the detection object, and the distance is a distance between a point representing the one-dimensional location of the detection object and the size of the detection object and the approximate curve; or a step of performing control to record a correspondence relationship between a two-dimensional location of the detection object and a size of the detection object in predetermined two axial directions in the captured image, wherein the function is a three-dimensional approximate curved surface of the two-dimensional location of the detection object and the size of the detection object, and the distance is a distance between a point representing the two-dimensional location of the detection object and the size of the detection object and the approximate curved surface.

3. A non-transient computer-readable recording medium, recording a program for an image recognition device, being an image recognition program for causing a computer to function as the image recognition device according to claim 1, and the program being configured to cause a computer to function as the processor.

* * * * *